(12) United States Patent
Alfes et al.

(10) Patent No.: US 9,568,014 B2
(45) Date of Patent: Feb. 14, 2017

(54) GAS SYSTEM FOR COMPRESSING A PROCESS GAS

(75) Inventors: Ludger Alfes, Dorsten (DE); Klaus Eisele, Neukirchen-Vluyn (DE); Thomas Mönk, Gladbeck (DE); Markus Reinhold, Düsseldorf (DE); Axel Spanel, Duisburg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 859 days.

(21) Appl. No.: 13/980,338

(22) PCT Filed: Jan. 26, 2012

(86) PCT No.: PCT/EP2012/051214
§ 371 (c)(1),
(2), (4) Date: Aug. 21, 2013

(87) PCT Pub. No.: WO2012/101208
PCT Pub. Date: Aug. 2, 2012

(65) Prior Publication Data
US 2014/0050569 A1 Feb. 20, 2014

(30) Foreign Application Priority Data

Jan. 26, 2011 (DE) .................. 10 2011 003 173

(51) Int. Cl.
| | |
|---|---|
| *F01D 1/12* | (2006.01) |
| *F04D 29/08* | (2006.01) |
| *F04D 17/12* | (2006.01) |
| *F04D 29/10* | (2006.01) |
| *F16J 15/40* | (2006.01) |
| *B01D 53/14* | (2006.01) |

(52) U.S. Cl.
CPC ............... *F04D 29/08* (2013.01); *F04D 17/12* (2013.01); *F04D 29/104* (2013.01); *F16J 15/406* (2013.01); *B01D 53/1475* (2013.01)

(58) Field of Classification Search
CPC ........ F04D 17/12; F04D 29/104; F04D 29/08; F16J 15/406; B01D 53/1475
USPC ........................................................ 415/58.5
See application file for complete search history.

(56) References Cited

U.S. PATENT DOCUMENTS

| | | | |
|---|---|---|---|
| 6,231,302 B1 | 5/2001 | Bonardi | |
| 2012/0093643 A1* | 4/2012 | Alfes | .................... F04D 29/124 415/230 |

FOREIGN PATENT DOCUMENTS

| | | |
|---|---|---|
| CN | 2208627 Y | 9/1995 |
| DE | 1293390 B | 4/1969 |
| DE | 2411243 A1 | 9/1974 |
| DE | 102009017614 A1 | 10/2010 |
| JP | 2000303990 A | 10/2000 |

\* cited by examiner

Primary Examiner — Jason Shanske

(57) ABSTRACT

A gas system has a first compressor stage for compressing a process gas. The first compressor stage includes an intake side and a pressure side. A seal gas is provided outside the first compressor stage in order to prevent process gas from issuing from leaks in the first compressor stage, having at least one second line for returning a gas mixture issuing from the gas system, this mixture including at least of process gas and seal gas. The at least one second line is configured for returning the issuing gas mixture to the intake side of the first compressor stage and/or to a location in the gas system upstream of the first compressor stage.

8 Claims, 2 Drawing Sheets

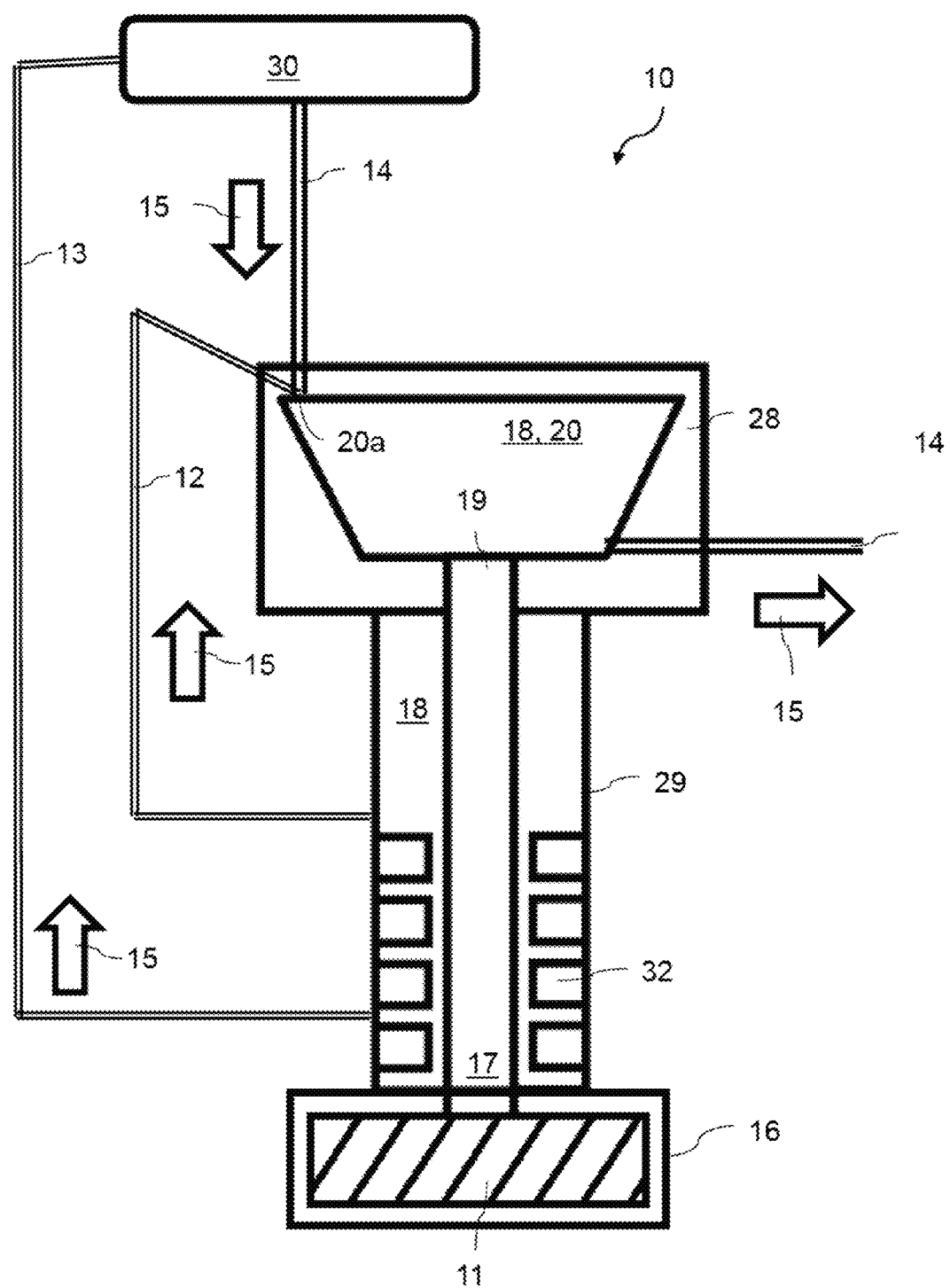

GAS SYSTEM FOR COMPRESSING A PROCESS GAS

CROSS REFERENCE TO RELATED APPLICATIONS

This application is the US National Stage of International Application No. PCT/EP2012/051214 filed Jan. 26, 2012 and claims benefit thereof, the entire content of which is hereby incorporated herein by reference. The International Application claims priority to the German application No. 102011003173.1 DE filed Jan. 26, 2011, the entire contents of which is hereby incorporated herein by reference.

FIELD OF INVENTION

The invention relates to a gas system, in particular a gas system for compressing a process gas.

BACKGROUND OF INVENTION

Gas systems for compressing process gas are widely used in industry. In such circumstances, for example in the case of separating $CO_2$ from the exhaust gas of combustion processes, a plurality of compressors or compressor stages are arranged in series, wherein the intake side of each successive compressor stage is connected to the pressure side of the preceding compressor stage. As a result, greater compression can be achieved than with only one compressor stage. Cooling units, such as for example heat exchangers, can be arranged in the gas system between the individual compressor stages, in order to cool the flow of gas—which has a raised temperature after compression—again before the next compression stage. However, highly compressed process gas also makes high demands on the gas tightness of the gas system. Points where a shaft, to which the compressor rotors are attached, passes through the pressure-bearing housing enclosing the rotors are possible sources of leakage. The process gas issuing from this leakage source is captured and fed back into the flow of gas in the gas system. In so doing, care must be taken to ensure that the pressure of the captured process gas from the leakage is greater than the pressure of the process gas at that location of the gas system where the captured process gas is fed back into the gas system. In order to further minimize leaks in this region, the outer spaces around the shaft passages are enclosed by a further housing inside which is a seal gas. $N_2$ or air can for example be used as seal gas in this context. This seal gas is under such a high pressure that it is impossible for the process gas to flow out through the shaft passages. However, it can be advantageous not to entirely prevent the leakage of process gas at the shaft passages. It is known to capture the mixture of seal gas and process gas. The captured mixture is then released into the environment or, if for example the process gas and/or the seal gas is toxic and/or flammable, is disposed of in a separate process. The process gas contained in the gas mixture is thereby lost.

SUMMARY OF INVENTION

The object of the invention is to achieve a gas system in which reduced losses—and in particular no losses—of process gas occur and which is thereby more efficient and which is noteworthy by reason of the associated environmental pollution being low or nil.

These objects are achieved by the features of the independent claim(s). Further features and details of the invention will become apparent from the dependent claims, the description and the figures.

The object is achieved in accordance with the invention by a gas system with a first compressor stage for compressing a process gas. The first compressor stage of the gas system has in this context an intake side and a pressure side. The gas system in accordance with the invention also provides a seal gas outside the first compressor stage in order to prevent process gas from issuing from leaks in the first compressor stage. The seal gas is in this context located inside a housing which encloses the shaft passage of the first compressor stage. The gas system in accordance with the invention also has one second line for returning a gas mixture issuing from the gas system, this mixture consisting at least of process gas and seal gas, wherein the at least one second line is configured for returning the issuing gas mixture to the intake side of the first compressor stage and/or to a location in the gas system upstream of the first compressor stage. Devices such as one or more capture systems can be provided for capturing the mixture consisting at least of seal gas and process gas.

The gas system in accordance with the invention has, in this context, the advantage that a gas mixture consisting at least of process gas and seal gas can be fed back into the gas system. Thus, no process gas present in the gas mixture is lost, allowing the efficiency of the gas system to be increased. Furthermore, returning the gas mixture avoids environmental pollution or, for example in the case of toxic process gases, additional expense resulting from separate storage of the gas mixture consisting of process gas and seal gas can be avoided and costs can thus be spared.

In addition, in accordance with a preferred development of the invention, in the context of the gas system in accordance with the invention at least one first line can be provided for returning process gas issuing from leaks in the gas system—these leaks being located downstream of the first compressor stage—to the intake side of the first compressor stage. A gas system of this type thus has the advantage that any process gas leaving the gas system through leaks at the first compressor stage is returned through the first line and, in particular, a gas mixture consisting at least of process gas and seal gas is also fed back into the gas system. Thus, no process gas is lost, allowing the efficiency of the gas system to be increased further.

In a particularly preferred development of the invention, it can be provided that at least one second compressor stage is provided which is arranged in series with the first compressor stage, wherein each compressor stage comprises an intake side and a pressure side and the seal gas is provided outside each compressor stage in order to prevent process gas from issuing from leaks in the compressor stages. It can further be provided that the at least one second line is configured for returning the gas mixture issuing from the gas system to the intake side of a compressor stage. It can in particular be provided that the at least one second line is configured for returning the gas mixture issuing from the gas system to the intake side of the first compressor stage, and/or to the location in the gas system upstream of the first compressor stage. Using multiple series-connected compressor stages, in particular two or more compressor stages, makes it possible to achieve greater compression of the process gas.

It can in addition be provided, in the context of the gas system in accordance with the invention, for first lines to be provided for returning process gas issuing from leaks in the gas system—these leaks being located downstream of each compressor stage—to the intake side of at least one compressor stage.

In the case of gas systems which are formed in this manner, pure process gas can be captured and returned to the intake side of at least one compressor stage by means of first lines. In this context, all first lines can be led to the intake side of the first compressor stage, or alternatively to the intake sides of one compressor stage or multiple further compressor stages. It must be ensured here, when planning the gas system, that the first lines always run from leaks downstream of a compressor stage to an intake side of a compressor stage which is upstream—in terms of the gas flow—of this leak. Furthermore, a gas mixture, consisting at least of process gas and seal gas, can be captured at all compressor stages and conducted to the intake side of one compressor stage, in particular the first compressor stage. Losses of process gas can thus be avoided and the efficiency of the gas system thereby increased.

As an alternative, the gas mixture can be conducted through the at least one second line to a location in the gas system upstream of the first compressor stage. In particular, for example in the case of $CO_2$ absorbers in industrial plants, the gas mixture can be fed back in at that location, the process gas ($CO_2$) is cleaned of the seal gas in the absorbers and is fed back to the gas system for compression. This also achieves an increase in efficiency while protecting the environment.

It can furthermore be provided in a gas system in accordance with the invention that the first compressor stage and/or that at least one of the at least one second compressor stages is a geared turbocompressor. In the case of a geared turbocompressor, a plurality of small individual compressor stages are grouped together in a housing in such a way that the small individual compressors have parallel shafts which are driven by at least one large drive gearwheel, also termed the transmission. A geared turbocompressor thus allows a particularly compact and therefore space-saving construction of a gas system in accordance with the invention.

It can furthermore be provided in a gas system in accordance with the invention that the location in the gas system upstream of the first compressor stage is an absorber, in particular a $CO_2$ absorber. This configuration of the gas system in accordance with the invention makes it possible for example for the gas system in accordance with the invention to be used for separating $CO_2$ from exhaust gases of industrial plants. Here in particular it is important not to release any process gas, especially $CO_2$, into the environment. In order to obtain $CO_2$ which is as pure as possible as highly compressed process gas at the end of the gas system, in this embodiment of the gas system in accordance with the invention the mixture of process gas and seal gas is fed directly into the $CO_2$ separation process in the $CO_2$ absorber. The process gas, in particular $CO_2$, is thereby separated from the seal gas and is fed into the gas system again to be compressed. This results in process gas with a particularly high degree of purity and thus particularly good effectiveness of the gas system.

BRIEF DESCRIPTION OF THE DRAWINGS

The invention and the developments thereof, and also the associated advantages, will in the following be explained in more detail with reference to the schematic drawings, in which:

FIG. 2 shows a view of an exemplary configuration of a gas system formed in accordance with the design principle in accordance with the invention and having one compressor stage.

DETAILED DESCRIPTION OF INVENTION

Figure 1:
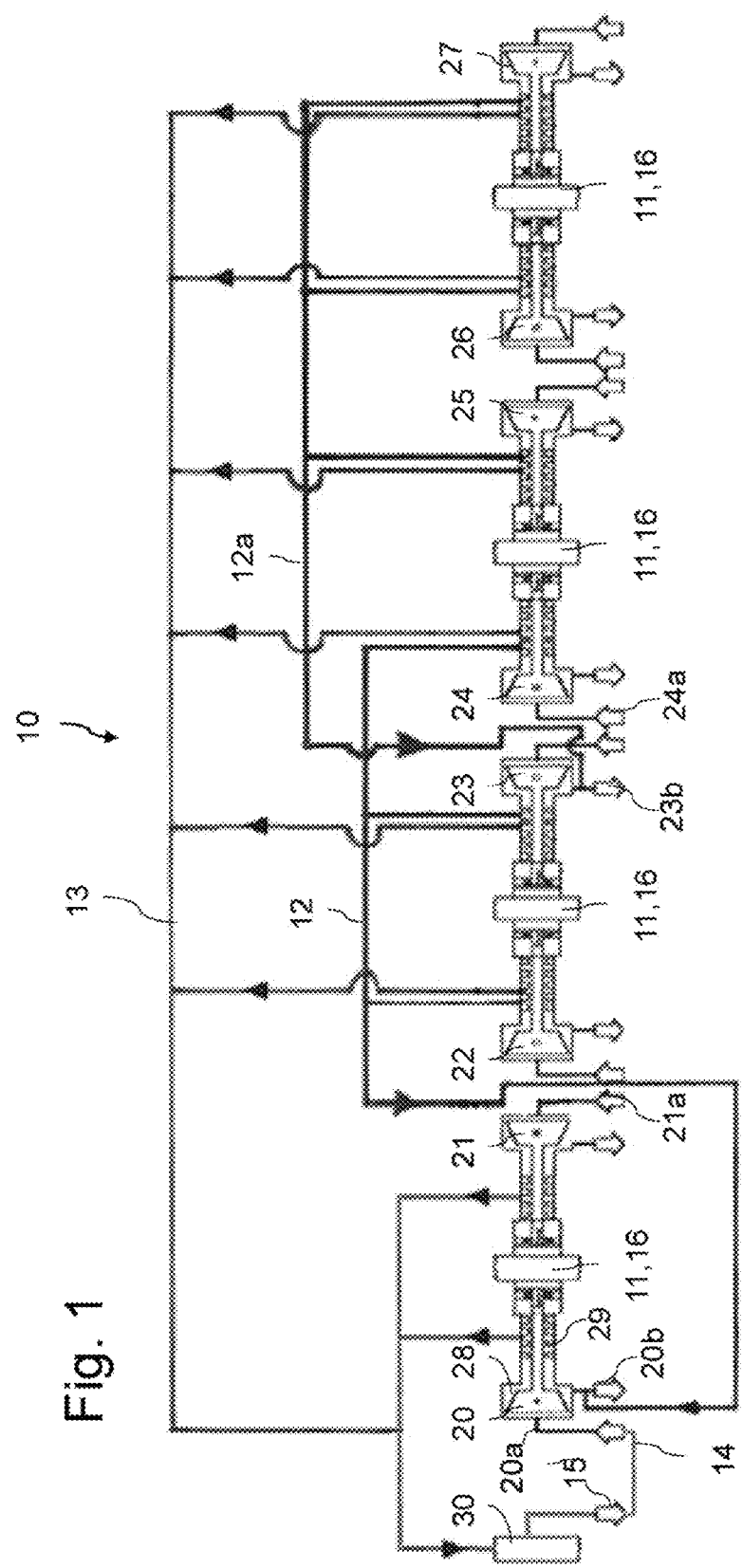
FIG. 1 shows a view of an exemplary configuration of a gas system formed in accordance with the design principle in accordance with the invention and having eight compressor stages.

Elements having the same function and mode of operation are in each case labeled with the same reference symbol in FIGS. 1 and 2.

FIG. 1 shows a schematic view of an exemplary configuration of a gas system 10 in accordance with the invention, wherein the gas system 10 has eight compressor stages 20-27. Each of the compressor stages 20 to 27 has one intake side (20a to 27a) and one pressure side (20b to 27b), those of which which are mentioned in this description are indicated in FIG. 1. The compressor stages 20-27 are in this case connected in series and connected via gas lines 14, with only the gas line 14 to the first compressor stage 20 being depicted. The pressure sides 20b-26b are in each case connected to the intake sides 21a-27a. The gas flow direction 15, indicated by arrows, with only the first arrow being marked, extends in this manner through the entire gas system 10, with the process gas 18 being progressively more compressed. In the exemplary embodiment shown, in each case two compressor stages (20 and 21, 22 and 23, 24 and 25, 26 and 27) are in each case driven by a common transmission shaft 11 in a common transmission housing 16. Furthermore, each of the compressor stages 20 to 27 has a compressor housing 28 and a shaft sealing housing 29, which by way of example are indicated on the compressor stage 20. Leaks of the process gas 18 downstream of the compressor stages 22, 23 and 24 are conducted via a first line 12 to the pressure side 20b of the compressor stage 20 and hence to the intake side 21a of the compressor stage 21. Leaks of the process gas 18 downstream of the processor stages 25, 26 and 27 are conducted via the line 12a to the pressure side 23b of the compressor stage 23 and hence to the intake side 24a of the compressor stage 24. This line design thus takes into account the already raised pressure of the process gas 18 at the compressor stages which are set up downstream in the direction of the gas flow 15. Not shown is that line which optionally conducts the leaks and/or issuing process gas 18 from the two first compressor stages 20 and 21 to the intake side 20a of the first compressor stage 20. Each of the four transmission shafts 11 is arranged in a transmission housing 16. In an alternative embodiment, they can also be arranged in a common transmission housing 16. The shaft passages through the transmission housing 16 and through the compressor housing 28 which encloses the rotors are surrounded by shaft sealing housings 29 which are filled with seal gas 17 under increased pressure. A mixture of process gas 18 and seal gas 17, flowing out through leaks in the shaft sealing housing 29, are captured and returned through a second line 13 to a $CO_2$ absorber 30 which is located in the gas system 10 upstream of the first compressor stage 20. The process gas, in particular $CO_2$, is cleaned of the seal gas 17 in the $CO_2$ absorber 30 and is again fed to the first compressor stage 20 via the gas line 14. This sealing design means that no process gas 18 is lost and the effectiveness of the overall gas system is thereby increased.

FIG. 2 shows a view of an exemplary configuration of a gas system 10, formed in accordance with the design principle in accordance with the invention, having one compression stage 20. The compressor stage 20 depicted can in this context also be the first of a plurality of compressor stages. The compressor stage 20 is driven by a transmission shaft 11 which is located in a transmission housing 16. The transmission housing 16 is connected to the compressor housing 28 by means of a shaft sealing housing 29 containing elements 32 for influencing the pressure and volumetric flow rate of process gas 18, seal gas 17 and the mixture of the two. Gas lines 14 are located upstream and downstream of the compressor stage 20; the gas flow direction 15 is shown symbolically by an arrow. Process gas 18 issuing from leaks downstream of the compressor stage 20 is captured and conducted through a first line 12 to the intake side 20a of the compressor stage 20. In order to avoid as far as possible an outflowing of process gas 18 through leaks at the points where the shaft 19 passes through the compressor housing 28, a seal gas 17 is present inside the shaft sealing housing 29. The pressure of this seal gas 17 is matched to the pressure of the process gas 18 in the compressor stage 20. A possible inlet line, by means of which the seal gas 17 can be introduced into the shaft sealing housing, is not shown. Issuing process gas 18 mixes with the seal gas 17 in the shaft sealing housing 29. The mixture of seal gas 17 and process gas 18 is captured and is also fed via a second line 13 to the gas system 10, for example to an absorber 30. This sealing design means that no process gas 18 is released into the environment, nor is costly disposal thereof necessary.

The invention claimed is:
1. A gas system, comprising:
a first compressor stage for compressing a process gas, wherein the first compressor stage comprises an intake side and a pressure side and is surrounded by a compressor housing,
a transmission shaft in a transmission housing, wherein the transmission shaft passes through the transmission housing and through the compressor housing,
a shaft sealing housing filled with a seal gas, wherein the shaft sealing housing encloses the transmission shaft, wherein the shaft sealing housing includes at least one second line,
wherein the seal gas is outside the first compressor stage in order to prevent process gas from issuing from leaks in the first compressor stage,
wherein the at least one second line returns a gas mixture issuing from the gas system, this mixture comprising at least process gas and seal gas,
wherein the at least one second line is configured for returning the issuing gas mixture to the intake side of the first compressor stage, to a location in the gas system upstream of the first compressor stage, or to the intake side of the first compressor stage and to the location in the gas system upstream of the first compressor stage,
wherein at least one first line is provided for returning process gas issuing from leaks in the gas system to the intake side of the first compressor stage, said leaks being located downstream of the first compressor stage.

2. The gas system as claimed in claim 1,
wherein at least one second compressor stage is provided which is arranged in series with the first compressor stage,
wherein each of the at least one second compressor stages comprises an intake side and a pressure side and each of the at least one second compressor stages is surrounded by a compressor housing,
at least one transmission shaft each in a transmission housing, wherein the at least one transmission shaft passes through the transmission housing and through the compressor housing,
at least one shaft sealing housing filled with a seal gas, wherein each of the at least one shaft sealing housings encloses each of the at least one transmission shafts, wherein each of the at least one shaft sealing housings includes at least one second line,
wherein seal gas is provided outside the first compressor stage and each of the at least one second compressor stage in order to prevent process gas from issuing from leaks in the first compressor stage and each of the at least one second compressor stages,
wherein the at least one second line is configured for returning the gas mixture issuing from the gas system to the intake side of the first compressor stage, one of the at least one second compressor stages, to the location in the gas system upstream of the first compressor stage, or to the intake side of the first compressor stage, one of the at least one second compressor stages and to the location in the gas system upstream of the first compressor stage.

3. The gas system as claimed in claim 2, wherein if the at least one second line is configured for returning the gas mixture issuing from the gas system to the intake side of one of the compressor stages or to the intake side of one of the compressor stages and to the location in the gas system upstream of the first compressor stage, the at least one second line is configured for returning the gas mixture issuing from the gas system to the intake side of the first compressor stage or to the intake side of the first compressor stage and to the location in the gas system upstream of the first compressor stage.

4. The gas system as claimed in claim 2, wherein the at least one first line is provided for returning process gas issuing from leaks in the gas system to the intake side of at least one compressor stage, said leaks being located downstream of each compressor stage.

5. The gas system as claimed in claim 1, wherein the first compressor stage is a geared turbocompressor.

6. The gas system as claimed in claim 2, wherein the first compressor stage, the at least one of the at least one second compressor stages, or the first compressor stage and the at least one of the at least one second compressor stages is a geared turbocompressor.

7. The gas system as claimed in claim 1, wherein the location in the gas system upstream of the first compressor stage is an absorber.

8. The gas system as claimed in claim 7, wherein the absorber is a $CO_2$ absorber.

* * * * *